(12) United States Patent
Park et al.

(10) Patent No.: US 11,081,735 B2
(45) Date of Patent: Aug. 3, 2021

(54) METHOD AND APPARATUS FOR CHARGING BATTERY

(71) Applicant: LG CHEM, LTD., Seoul (KR)

(72) Inventors: Jiyoung Park, Daejeon (KR); Pil Kyu Park, Daejeon (KR); Kwi Sub Yun, Daejeon (KR); So Ra Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 269 days.

(21) Appl. No.: 16/349,018

(22) PCT Filed: Sep. 20, 2018

(86) PCT No.: PCT/KR2018/011167
§ 371 (c)(1),
(2) Date: May 10, 2019

(87) PCT Pub. No.: WO2019/093654
PCT Pub. Date: May 16, 2019

(65) Prior Publication Data
US 2021/0104782 A1    Apr. 8, 2021

(30) Foreign Application Priority Data
Nov. 13, 2017   (KR) .................. 10-2017-0150907

(51) Int. Cl.
*H02J 7/00*     (2006.01)
*H01M 10/44*    (2006.01)

(52) U.S. Cl.
CPC ..... *H01M 10/441* (2013.01); *H02J 7/007182* (2020.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 4,503,378 A | * | 3/1985 | Jones | H02J 7/007184 320/161 |
| 5,760,572 A | | 6/1998 | Takeda et al. | |
| 5,900,782 A | * | 5/1999 | Igarashi | H03G 1/04 330/254 |

(Continued)

FOREIGN PATENT DOCUMENTS

| | | |
|---|---|---|
| JP | 7-334259 A | 12/1995 |
| JP | 3879598 B2 | 2/2007 |

(Continued)

OTHER PUBLICATIONS

Extended European Search Report for European Application No. 18876050.8, dated Apr. 15, 2020.

*Primary Examiner* — Arun C Williams
(74) *Attorney, Agent, or Firm* — Birch, Stewart, Kolasch & Birch LLP

(57) ABSTRACT

A method of charging a battery including a plurality of cells, the method including charging the plurality of cells at a plurality of C-rates, respectively; calculating a voltage change of each of the plurality of cells and a slope of the voltage change of each of the plurality of cells; and performing discharging multiple times in a section where a deviation between the slopes of the voltage changes of the plurality of cells is equal to or larger than a predetermined reference value.

8 Claims, 5 Drawing Sheets

(56) References Cited

U.S. PATENT DOCUMENTS

| | | | |
|---|---|---|---|
| 10,605,870 B2 | 3/2020 | Kim et al. | |
| 2006/0093894 A1 | 5/2006 | Scott et al. | |
| 2008/0157539 A1* | 7/2008 | Tani | H02J 1/14 290/40 C |
| 2010/0004885 A1* | 1/2010 | Nakanishi | B60L 3/0046 702/63 |
| 2010/0266916 A1* | 10/2010 | Imanishi | H01M 10/44 429/429 |
| 2011/0004427 A1* | 1/2011 | Gorbold | H01M 10/425 702/63 |
| 2011/0074994 A1* | 3/2011 | Wakabayashi | H03M 1/1023 348/302 |
| 2011/0076530 A1* | 3/2011 | Miyamoto | H01M 10/4207 429/61 |
| 2012/0019263 A1* | 1/2012 | Marshall | G01R 31/2637 324/658 |
| 2012/0181956 A1* | 7/2012 | Rossel | H02J 7/0016 318/376 |
| 2012/0200266 A1* | 8/2012 | Berkowitz | H02J 7/0021 320/139 |
| 2013/0026976 A1 | 1/2013 | Lu | |
| 2014/0009090 A1* | 1/2014 | Ashida | B60L 3/04 318/139 |
| 2014/0191731 A1 | 7/2014 | Miura | |
| 2014/0300180 A1* | 10/2014 | Iwashita | B60L 3/00 307/10.1 |
| 2015/0340885 A1 | 11/2015 | Baek et al. | |
| 2016/0111898 A1 | 4/2016 | Luo et al. | |
| 2016/0226269 A1 | 8/2016 | Hwang et al. | |
| 2017/0054184 A1 | 2/2017 | Tanabe et al. | |
| 2017/0234930 A1 | 8/2017 | Lee et al. | |
| 2018/0138722 A1 | 5/2018 | Yoon | |

FOREIGN PATENT DOCUMENTS

| | | |
|---|---|---|
| JP | 2013-89363 A | 5/2013 |
| KR | 10-2013-0102647 A | 9/2013 |
| KR | 10-1326118 B1 | 11/2013 |
| KR | 10-2015-0133587 A | 11/2015 |
| KR | 10-2016-0045555 A | 4/2016 |
| KR | 10-2016-0094229 A | 8/2016 |
| KR | 10-2017-0023583 A | 3/2017 |
| KR | 10-2017-0058072 A | 5/2017 |
| WO | WO 2007/030816 A2 | 3/2007 |
| WO | WO 2017/030309 A1 | 2/2017 |

\* cited by examiner

[Figure 1]
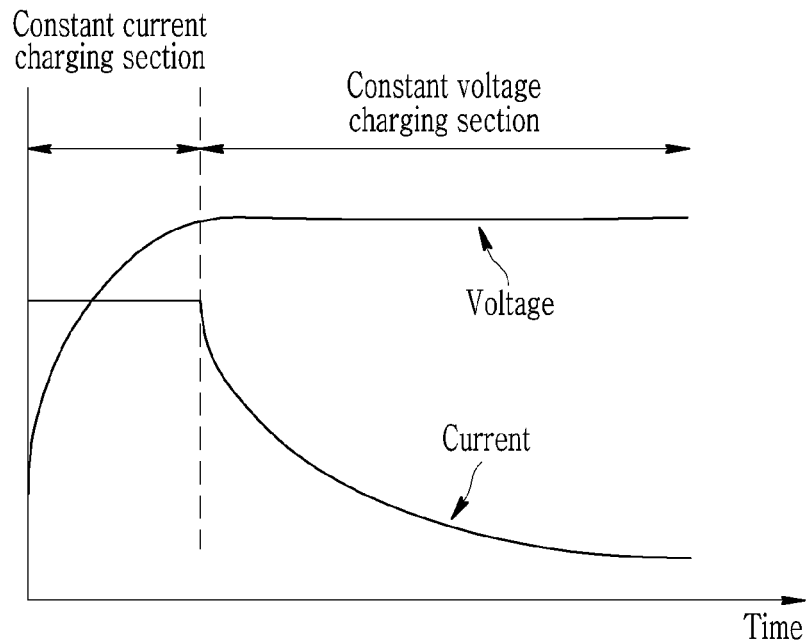
[Figure 2]
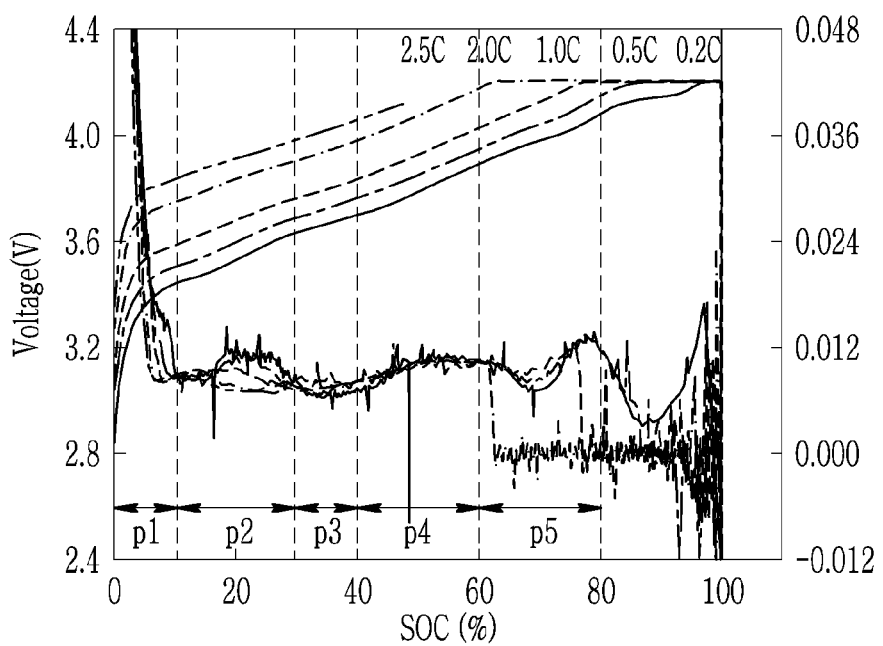

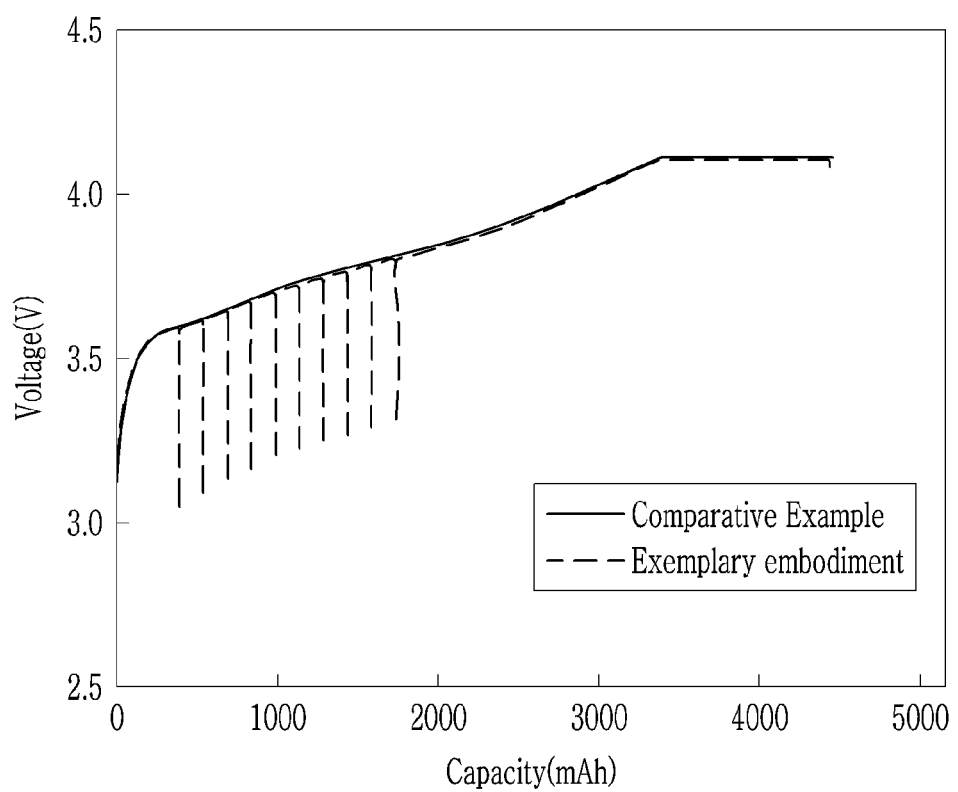
[Figure 3]

[Figure 4]
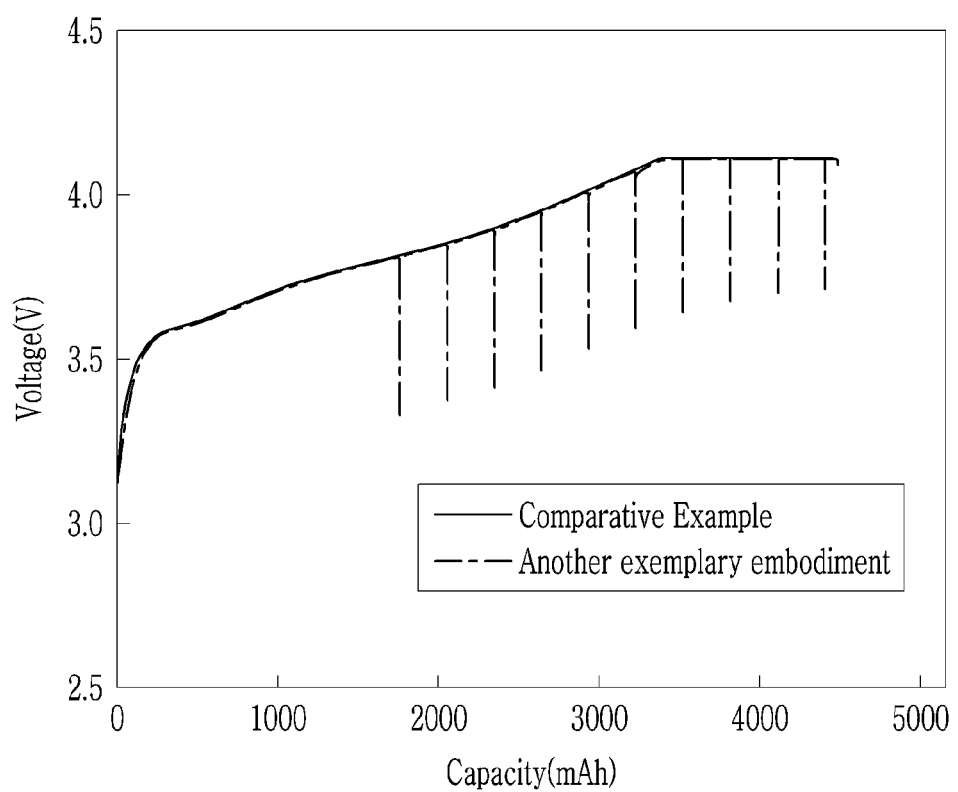

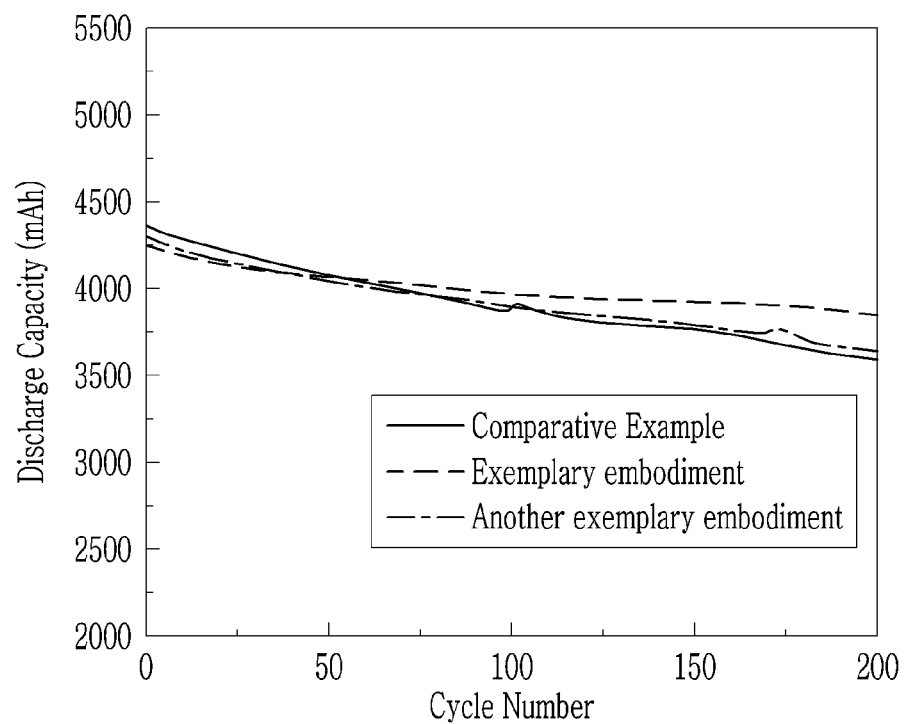
[Figure 5]

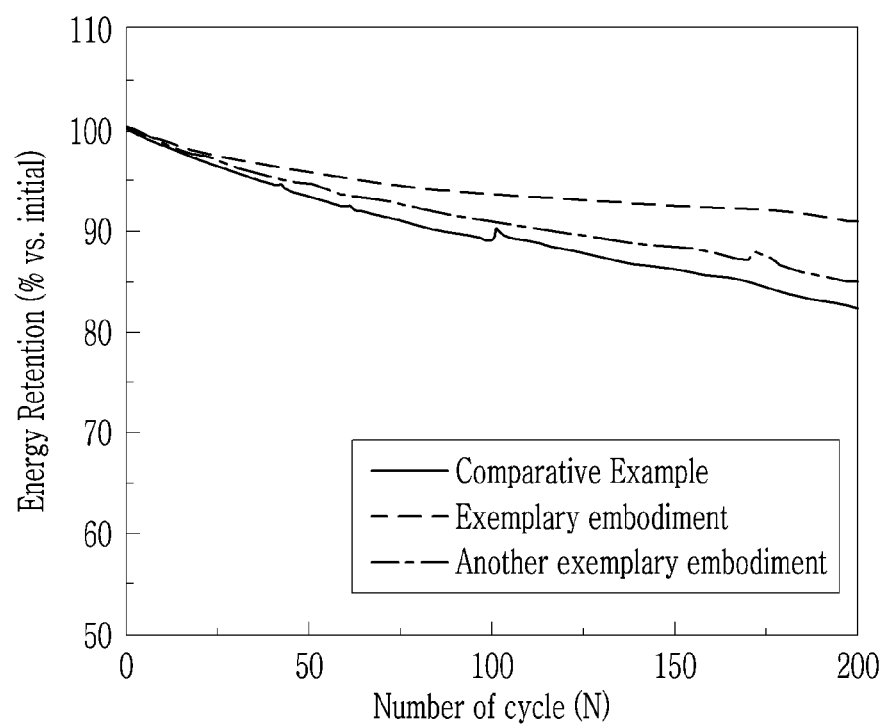
[Figure 6]

METHOD AND APPARATUS FOR CHARGING BATTERY

CROSS-REFERENCE TO RELATED APPLICATION

This application claims priority to and the benefit of Korean Patent Application No. 10-2017-0150907 filed in the Korean Intellectual Property Office on Nov. 13, 2017, the entire contents of which are incorporated herein by reference.

TECHNICAL FIELD

The present invention relates to a battery field, and more particularly, to a method and an apparatus for charging a battery.

BACKGROUND ART

Recently, there has been a growing interest in energy storage technology. Above all, development of a rechargeable battery capable of being easily charged/discharged has been the focus of interest. The rechargeable battery has attracted attention as a new energy source for improving an environmentally-friendly characteristic and energy efficiency in that it is possible to decrease the use of fossil fuel, which is the primary advantage, and a byproduct resulting from the use of energy is not generated at all.

Among the rechargeable batteries widely used now, a lithium ion battery is in the limelight in various fields due to the advantages of having a higher operation voltage and a far higher energy density than the rechargeable batteries in the related art, such as Ni-MH, Ni—Cd and sulfuric acid-lead batteries, which use an aqueous electrolyte solution.

With the development of portable electronic devices such as a mobile phone or laptop computer, demands for the rechargeable battery as an energy source thereof have sharply increased. In recent years, the use of the rechargeable battery as a power source of a hybrid electric vehicle (HEV) and an electric vehicle (EV) has been realized. Accordingly, a lot of research has been conducted on rechargeable batteries capable of meeting various demands, and particularly, demands for lithium rechargeable batteries having a high energy density, and a high discharging voltage and output are increasing.

A lithium rechargeable battery used in an electric vehicle and the like needs to have a high energy density and characteristics capable of exhibiting a high output in a short time, and needs to be usable for 10 years or more under severe conditions in which the battery is repeatedly charged and discharged with a large current in a short time, so that the lithium rechargeable battery is inevitably required to have an output characteristic and a long lifespan characteristic far superior to those of a small lithium rechargeable battery in the related art.

Particularly, rapid charging tends to depend on a property of a negative electrode. Accordingly, it is necessary to prevent overcharging of the negative electrode, decrease the resistance of the negative electrode, and increase a state of charge to prevent the precipitation of lithium metal from occurring on the surface of the negative electrode. Thus, there is a need for development of an electrolyte for preventing the deterioration in negative electrode characteristics and accelerating the diffusion of lithium ions in an active material in a rapid charging environment.

Particularly, a lithium rechargeable battery, which is a battery using lithium (Li) as the name suggests, has a high energy density and is light, but has a disadvantage in that the lithium rechargeable battery can easily form dendrites and thus is dangerous. Specifically, electricity is stored by a process in which Li ions released from a positive electrode move into a negative electrode at the time of charging the battery. In this process, the Li ions released from the positive electrode at an initial stage of the charging enter the negative electrode through the electrolyte, and a polarization phenomenon occurs at the interface between the materials, which results in an overvoltage. At this time, if there are insufficient movable ions compared to the amount of flowing current, lithium ions are precipitated by the overvoltage The lithium precipitation is caused not only by the movement of lithium ions but also by the electrical resistance, and the movement of ions is closely related to the porosity of the electrode and the like. The higher the porosity, the larger the mobility of Li ions, but a height of an electrical contact surface is reduced, so that it is necessary to appropriately adjust the porosity, but it is very difficult to appropriately adjust the porosity. In particular, there is a problem in that the high porosity naturally leads to a low energy density. For this reason, a first attempt to commercialize a rechargeable battery using a Li-metal as a negative electrode failed due to a problem with safety.

In addition, a larger amount of byproducts are accumulated due to the side reaction around the lithium metal, which has been precipitated, and the cycle performance deteriorates, and in a severe case, the byproducts may break through a separator to cause a micro-short and result in an explosion and the like.

Thus, many researchers have devised a method for suppressing such Li-plating, but have not yet obtained satisfactory results in a current situation that requires an increasingly high energy density.

Particularly, when the ion conductivity is reduced in a rechargeable battery requiring the rapid charging, an overvoltage is generated at the negative electrode due to a shortage of ions compared to the amount of flowing current, and as a result, Li-plating on the surface of the negative electrode may be worsened. Accordingly, there is a need for a technology of achieving the rapid charging without causing the Li-plating.

DISCLOSURE

Technical Problem

The present invention has been made in an effort to provide a method and an apparatus for charging a battery having an advantage of shortening a charging time.

The present invention has also been made in an effort to provide a method and an apparatus for charging a battery having an advantage of shortening a charging time while suppressing Li-plating of the battery.

The present invention has also been made in an effort to provide a method and an apparatus for charging a battery having an advantage of shortening a charging time while preventing an overvoltage of the battery.

The present invention has also been made in an effort to provide a method and an apparatus for charging a battery having improved capacity retention.

Technical Solution

An exemplary embodiment of the present invention provides a method of charging a battery including a plurality of cells, the method including: charging the plurality of cells at a plurality of C-rates, respectively; calculating a voltage change (dV/dQ) of each of the plurality of cells and a slope of the voltage change of each of the plurality of cells; and performing discharging multiple times in a section where a deviation between the slopes of the voltage changes of the plurality of cells is equal to or larger than a predetermined reference value.

Further, the performing of the discharging multiple times in the section where the deviation between the slopes of the voltage changes of the plurality of cells is equal to or larger than the predetermined reference value may include performing the discharging multiple times in the section in a form of a pulse.

Further, the performing of the discharging multiple times in the section in the form of the pulse may include performing the discharging in the section in the form of the pulse multiple times, and the number of multiple times is larger than a predetermined number of times previously set.

Further, the method may further include performing discharging multiple times in the form of a pulse after the section.

Another exemplary embodiment of the present invention provides an apparatus for charging a battery including a plurality of cells, in which the apparatus for charging a battery is configured to charge the plurality of cells at a plurality of C-rates, respectively, calculate a voltage change (dV/dQ) of each of the plurality of cells and a slope of the voltage change of each of the plurality of cells, and perform discharging multiple times in a section where a deviation between the slopes of the voltage changes of the plurality of cells is equal to or larger than a predetermined reference value.

Further, the apparatus is configured to perform the discharging multiple times in the section in a form of a pulse.

Further, the apparatus is configured to perform the discharging in the section in the form of the pulse multiple times, an the number of multiple times is larger than a predetermined number of times previously set.

Further, the apparatus may be further configured to perform discharging multiple times in the form of a pulse after the section.

Advantageous Effects

According to an exemplary embodiment of the present invention, there are provided a method and an apparatus for charging a battery capable of shortening a charging time.

Further, according to an exemplary embodiment of the present invention, there are provided a method and an apparatus for charging a battery capable of shortening a charging time while suppressing Li-plating of the battery.

Further, according to an exemplary embodiment of the present invention, there are provided a method and an apparatus for charging a battery capable of shortening a charging time while preventing an overvoltage of the battery.

Further, according to an exemplary embodiment of the present invention, there are provided a method and an apparatus for charging a battery having improved capacity retention.

DESCRIPTION OF THE DRAWINGS

FIG. 1 is a view illustrating a relationship between a charging current and a charging voltage according to a constant current constant voltage (CCCV) charging method in the related art.

FIG. 2 is a graph illustrating a charging voltage profile and a voltage change with respect to a state of charge (SOC) in a charging method according to an exemplary embodiment of the present invention.

FIG. 3 is a graph illustrating a charging voltage profile with respect to a state of charge in a sensitive section in the charging method according to an exemplary embodiment of the present invention.

FIG. 4 is a graph illustrating a charging voltage profile with respect to a state of charge after the sensitive section in the charging method according to another exemplary embodiment of the present invention.

FIG. 5 is a graph illustrating a discharge capacity with respect to the number of cycles in the charging method according to an exemplary embodiment of the present invention.

FIG. 6 is a graph illustrating an energy retention with respect to the number of cycles in the charging method according to the exemplary embodiment of the present invention.

MODE FOR INVENTION

A battery charging method in the related art includes a constant current (CC) method in which a battery is charged with a constant current from an initial stage to a completion stage of the charging, a constant voltage (CV) method in which the battery is charged with a constant voltage from an initial stage to a completion stage of the charging, and a constant current constant voltage charging method (hereinafter, referred to as the CCCV charging method) in which the battery is charged with a constant current at an initial stage of the charging and is charged with a constant voltage at the end of the charging.

The constant current (CC) method may refer to a method of supplying a battery with constant-current power up to a predetermined set voltage and charging the battery. While the constant current charging is performed, the voltage of the battery may be increased with the charging amount (or charging value) of the battery. That is, as the charging progresses, the voltage of the battery may be increased and reach the predetermined set voltage, and the set voltage may be set based on the charging value of the battery as a charging target. For example, in a lithium ion battery having a rated voltage of 4.2 V, 3.9 V may be set as a set voltage when the charging value of the lithium ion battery is 20%. That is, the completion of the constant current charging and switching to a charging method at a next step may be made based on the charging value of the battery. When the constant current charging is performed multiple times, each constant current charging may have a set voltage corresponding thereto.

Further, the constant voltage (CV) method may refer to a method in which when immediately previous constant current charging is performed and the voltage of the battery reaches a set voltage, the battery is charged while reducing the charging current so as to maintain the set voltage. For example, in a lithium ion battery having a rated voltage of 4.2 V, if the voltage of the lithium ion battery reaches the set voltage of 4.35 V due to the immediately previous constant current charging, during the constant voltage charging, the battery may be charged while reducing the charging current so as to maintain 4.35 V.

FIG. 1 is a view illustrating a relationship between a charging current and a charging voltage according to a CCCV charging method in the related art.

As illustrated in FIG. 1, the constant current constant voltage charging method (hereinafter, referred to as the CCCV charging method) is a method of charging a battery with a maximum current until a predetermined battery voltage is reached, and when the predetermined battery voltage is reached, charging the battery while gradually reducing a charging current.

In the present specification, 'C' is also referred to as a C-rate, and is a unit for setting a current value under various use conditions while charging and discharging the battery and predicting or indicating an available time of the battery, and a charging/discharging current value according to a charging/discharging rate is calculated by dividing a charging or discharging current by a rated capacity of the battery.

Further, SOC refers to a state of charge of the battery.

Further, the present invention relates to a battery charging method and the battery is a lithium ion battery.

However, an exemplary embodiment according to the present invention may be modified in various forms, and it should not be construed that the scope of the present invention is limited to exemplary embodiments to be described below. The exemplary embodiments of the present invention are provided for more completely explaining the present invention to the person with ordinary skill in the art.

In an exemplary embodiment of the present invention, the battery means a lithium ion battery, and it takes within 30 minutes for the SOC to reach 50% when the battery is charged by the CC/CCCV method at a driving voltage (for example, 4.1 V).

The exemplary embodiment of the present invention uses the CCCV charging method after performing the CC charging, but the present invention is not limited thereto, and detailed descriptions of the CC charging method and the CC charging method will be omitted herein to avoid duplication.

The exemplary embodiment of the present invention uses a step charging method that achieves a shortened charging time by dividing the charging method into a predetermined number of steps and applying a charging method suitable for each charging amount of the battery (for example, decreasing the C-rate), but the present invention is not limited thereto, and the step charging method may use the related art, so that a detailed description thereof will be omitted herein.

Further, according to the exemplary embodiment of the present invention, in the CCCV charging method, a region having a large C-rate sensitivity (hereinafter, referred to as the sensitive section) is divided in the SOC section, and in the sensitive section, short discharging (reverse pulse) is performed multiple times in a form of a pulse, thereby reducing Li-plating.

Hereinafter, a battery charging method according to the present invention capable of reducing Li-plating by performing discharging multiple times in the sensitive section will be described in detail.

FIG. 2 is a graph illustrating a charging voltage profile (Voltage) and a voltage change (dV/dQ) with respect to a state of charge (SOC) in a charging method according to the exemplary embodiment of the present invention.

Hereinafter, the battery charging method according to the present invention will be described in more detail with reference to FIG. 2

Referring to FIG. 2, a battery is CCCV charged at a plurality of C-rates (for example, 2.5 C, 2.0 C, 1.0 C, 0.5 C, and 0.2 C), and voltage changes (dV/dQ) corresponding to the plurality of C-rates and slopes of the voltage changes of the cells are calculated, and a plurality of predetermined sections p1 to p5 is arbitrarily set according to the SOC.

In the battery charging method according to the present invention, at the portion having a slope deviation between the voltage changes (dV/dQ) at each of the plurality of C-rates, a section where short discharging is performed multiple times, that is, the number of times (for example, ten times) larger than a predetermined number of times previously set is set.

Further, in the battery charging method according to the present invention, a section (p2, a section where SOC is 5 to 25) in which the slope deviation between the voltage changes (dV/dQ) at the plurality of C-rates is equal to or larger than a predetermined reference value is set as a sensitive section. In the sensitive section, the charging is most significantly affected by the C-rate, so that in the sensitive section, the short discharging is performed in a form of a pulse multiple times, that is, the number of times larger than a predetermined number of times previously set. Since the related art may be used for the step charging method, a detailed description of the step charging method will be omitted herein.

Hereinafter, a charging method in the sensitive section in the charging method according to an exemplary embodiment of the present invention will be described in detail with reference to FIGS. 3 to 6.

FIG. 3 is a graph illustrating a charging voltage profile (Voltage) with respect to a state of charge (Capacity, mAh) in the sensitive section in the charging method according to an exemplary embodiment of the present invention.

FIG. 4 is a graph illustrating a charging voltage profile (Voltage) with respect to a state of charge (Capacity, mAh) after the sensitive section in the charging method according to another exemplary embodiment of the present invention.

Referring to FIG. 3, the charging method according to the exemplary embodiment of the present invention charges the battery up to a cutoff voltage (for example, 4.1 V) at 1 C (for example, 4850 mA), performs short discharging in the sensitive section in a form of a pulse multiple times, for example, 10 times, and discharges the battery up to 2.5 V at 1 C.

Further, referring to FIG. 4, the charging method according to another exemplary embodiment of the present invention charges the battery up to a cutoff voltage (for example, 4.1 V) at 1 C (for example, 4850 mA), performs short discharging multiple times, for example, 10 times in a form of a pulse in sections after the sensitive section (for example, p4 and p5: sections where SOC is 40 to 90), and discharges the battery up to 2.5 V at 1 C.

FIG. 5 is a graph illustrating a discharge capacity with respect to the number of cycles in the charging method according to an exemplary embodiment of the present invention.

FIG. 6 is a graph illustrating an energy retention with respect to the number of cycles in the charging method according to the exemplary embodiment of the present invention.

Referring to FIGS. 5 and 6, it can be seen that the charging method according to the exemplary embodiment of the present invention performs the short discharging multiple times in the sensitive section, so that the energy retention is increased as compared with a Comparative Example. Further, it can be seen that the charging method according to another exemplary embodiment of the present invention performs the short discharging multiple times in the sections after the sensitive section, so that the energy retention is increased as compared with the Comparative Example.

In addition, the charging method according to the exemplary embodiment of the present invention and the charging method according to another exemplary embodiment of the present invention perform discharging multiple times at the time of charging the battery at a high C-rate (for example, 1 C), thereby alleviating an overvoltage at the time of the charging. In addition, according to the charging method according to the exemplary embodiment of the present invention and the charging method according to another exemplary embodiment of the present invention, it is possible to expect the effect of suppressing Li-plating by performing discharging multiple times.

Thus, it can be seen that according to the charging method according to the exemplary embodiment of the present invention and the charging method according to another exemplary embodiment of the present invention, the energy retention is increased as compared with the Comparative Example.

Further, the battery charging apparatus according to the exemplary embodiment of the present invention CCCV charges a battery at a plurality of C-rates (for example, 2.5 C, 2.0 C, 1.0 C, 0.5 C, and 0.2 C), calculates voltage changes (dV/dQ) corresponding to the plurality of C-rates and slopes of the voltage changes of the cells, and arbitrarily sets a plurality of predetermined sections (p1 to p5) according to the state of charge (SOC).

Further, the battery charging apparatus according to the exemplary embodiment of the present invention sets a section where short discharging is performed multiple times, that is, the number of times larger than a predetermined number of times at a portion having a slope deviation between the voltage changes (dV/dQ) at each of the plurality of C-rates.

Further, the battery charging apparatus according to the exemplary embodiment of the present invention sets a section (p2, a section where SOC is 5 to 25) in which the slope deviation between the voltage changes (dV/dQ) at a plurality of C-rates is equal to or larger than a predetermined reference value as a sensitive section. In the sensitive section, the charging is most significantly affected by the C-rate, so that in the sensitive section, short discharging is performed multiple times, that is, the number of times larger than the predetermined number of times.

Further, the battery charging apparatus according to the exemplary embodiment of the present invention charges the battery up to a cutoff voltage (for example, 4.1 V) at 1 C (for example, 4850 mA), performs short discharging in the sensitive section multiple times, for example, 10 times, and discharges the battery up to 2.5 V at 1 C.

In addition, the battery charging apparatus according to the exemplary embodiment of the present invention charges the battery up to a cutoff voltage (for example, 4.1 V) at 1 C (for example, 4850 mA), performs short discharging multiple times, for example, 10 times in sections after the sensitive section (for example, p4 and p5: sections where SOC is 40 to 90), and discharges the battery up to 2.5 V at 1 C.

The invention claimed is:

1. A method of charging a battery including a plurality of cells, the method comprising:
   charging the plurality of cells at a plurality of C-rates, respectively;
   calculating a voltage change (dV/dQ) of each of the plurality of cells and a slope of the voltage change of each of the plurality of cells; and
   performing discharging multiple times in a section where a deviation between the slopes of the voltage changes of the plurality of cells is equal to or larger than a predetermined reference value.

2. The method of claim 1, wherein:
   the performing of the discharging multiple times in the section where the deviation between the slopes of the voltage changes of the plurality of cells is equal to or larger than the predetermined reference value includes performing the discharging multiple times in the section in a form of a pulse.

3. The method of claim 2, wherein:
   the performing of the discharging multiple times in the section in the form of the pulse includes performing the discharging in the section in the form of the pulse multiple times, and
   the number of multiple times is larger than a predetermined number of times previously set.

4. The method of claim 3, further comprising:
   performing discharging multiple times in the form of a pulse after the section.

5. An apparatus for charging a battery including a plurality of cells, wherein:
   the apparatus is configured to charge the plurality of cells at a plurality of C-rates, respectively,
   calculate a voltage change (dV/dQ) of each of the plurality of cells and a slope of the voltage change of each of the plurality of cells, and
   perform discharging multiple times in a section where a deviation between the slopes of the voltage changes of the plurality of cells is equal to or larger than a predetermined reference value.

6. The apparatus of claim 5,
   wherein the apparatus is configured to perform the discharging multiple times in the section in a form of a pulse.

7. The apparatus of claim 6,
   wherein the apparatus is configured to perform the discharging in the section in the form of the pulse multiple times, and
   wherein the number of multiple times is larger than a predetermined number of times previously set.

8. The apparatus of claim 7,
   wherein the apparatus is configured to perform discharging multiple times in the form of a pulse after the section.

* * * * *